Dec. 5, 1961     D. P. HART ET AL     3,011,909
PRIMER COMPRISING AN EPOXY RESIN, A PHENOL-FORMALDEHYDE
RESIN AND A METHYL METHACRYLATE POLYMER, AND METHOD
OF BONDING A VINYL RESIN COATING TO
A SURFACE THEREWITH
Filed Jan. 16, 1957

INVENTORS
DONALD P. HART and
JOSEPH E. PLASYNSKI
BY
Oscar L. Spencer
ATTORNEY 3,011,909
PRIMER COMPRISING AN EPOXY RESIN, A PHENOL-FORMALDEHYDE RESIN AND A METHYL METHACRYLATE POLYMER, AND METHOD OF BONDING A VINYL RESIN COATING TO A SURFACE THEREWITH
Donald P. Hart, Allison Park, and Joseph E. Plasynski, Arnold, Pa., assignors to Pittsburgh Plate Glass Company, Allegheny County, Pa., a corporation of Pennsylvania
Filed Jan. 16, 1957, Ser. No. 634,564
7 Claims. (Cl. 117—72)

This invention comprises the provision of a novel coating medium and it has particular relation to a coating medium which is well adapted for use as a primer coat upon various surfaces under finishing coatings of so-called plastisols.

Valuable coating media termed "plastisols" have heretofore been prepared by dispersing finely pulverulent polyvinyl halides, such as polyvinyl chloride, in a plasticizer, such as one of the liquid esters of a dicarboxylic acid, and alcohol. The resultant dispersion is of a viscosity dependent upon the degree of compatibility or solubility of the polyvinyl halide particles in the plasticizer. The dispersion can be spread upon surfaces of various materials and when so spread, especially when the films are heated to an appropriate temperature, the particles of the polyvinyl halide are fused and the plasticizer becomes dissolved, or blended therein, thus providing homogeneous, continuous films having good hardness, toughness and resistance to the action of chemicals and solvents. The plastisols, however, are characterized by relatively poor adhesion to some of the common metals, such as aluminum, magnesium, steel and the like. Likewise, adhesion to many such materials as the ceramics and notably glazed or partially glazed ceramics is but poor.

In an attempt to obtain adhesion of plastisol films to the foregoing materials, or other materials, with which plastisols have but poor adhesion, an attempt has been conducted to provide priming coatings which have adequate adhesion to the substrates and also to the film of plastisol applied over the primer. However, owing to the requirements imposed upon the primer, it is very difficult to obtain one which will function satisfactorily in many common applications of plastisols. For example, the primer must adhere tenaciously both to the substrate and to the material of the finishing coat, namely the plastisol. This is a different requirement to meet and the difficulty is sometimes aggravated by the fact that the plasticizers in the plastisol tend strongly to migrate into the primer producing softening of the latter and causing it to lose its strength or its adhesion either to the substrate or to the plastisol film, or perhaps to both. When the films are baked, this tendency of the plasticizer to migrate into the primer is further accentuated.

A special problem is also encountered in the coating of metals such as sheet iron or steel employed in the fabrication of bottle caps, container lids, or similar articles. This is due to the fact that for reasons of economy, it is desirable to spread the primer upon a large surface of sheet metal and then to cure the primer. Subsequently, the metal having the primer is cut into shape and finally the blanks so formed are pressed into form. The pressing operation frequently results in a substantial degree of compression, drawing or stretching of the metal. Most primer materials having good bond to the metal and being adapted to bond to the plastisol films which are applied to the fabricated articles tend to crack and chip when the metal is compressed or stretched in the shaping operation.

This invention comprises the provision of a coating material which comprises a ternary mixture of (a) an ester of methacrylic acid, (b) an epoxy resin and (c) a heat reactive phenolic resin. This material, among its other valuable properties, is well adapted for use as a primer under plastisol films, even in some of the more difficult applications. For example, the material of this invention will successfully adhere to such substrates as magnesium, aluminum, steel, ceramic wares or the like, even under these conditions in which the substrate is subjected to distortion or rapid and relatively severe changes of temperature. Likewise, the material, when employed as a primer, will form a strong bond with the plastisol films applied thereupon and the good properties of the material as a priming material are maintained under the action of the plasticizer in the plastisol film. For example, the films retain their adhesion to the substrate and are not softened by the plasticizer, at least to the point of degradation.

The materials of this invention comprise as an essential component, a polymer containing an ester of methacrylic acid and a lower aliphatic alcohol, for example methyl alcohol. Preferably, the ester is also combined by interpolymerization, with a second monomer containing a $>C=CH_2$ group. Unsaturated compounds containing carboxyls and especially the esters of carboxylic acids and aliphatic alcohols, where at least one component contains a $>C=CH_2$ group, are particularly satisfactory as the added monomers to provide interpolymers adapted to blend with an epoxy resin and a heat reactive phenolic resin.

The resultant material has all or many of the valuable properties previously described. For example, it will successfully adhere to aluminum, magnesium, steel, ceramic wares and the like, and likewise, will adhere to plastisol films applied as finishing coats, without objectionable degradation by reason of the plasticizer carried in such plastisol. This is true even when the system is subjected to considerable heat in the fusion and blending of the vinyl halide particles into the plasticizer. The material may also be applied over sheet metal, such as is employed in fabricating bottle caps and the primed metal thus obtained may be cut and shaped without the priming coatings being cracked or chipped off in the operation.

THE METHACRYLIC ACID ESTER

In the fabrication of an interpolymer suitable for use in a material having the foregoing properties, various esters of methacrylic acid may be employed. However, the lower esters containing up to about 4 carbon atoms in the alcohol residue are presently preferred. These include the methyl or the ethyl esters, the propyl ester and the butyl ester. Particular emphasis is to be placed upon the methyl ester since it is the more common and more readily available material.

THE COMONOMER

Various comonomers may be incorporated with the methacrylate ester for purposes of copolymerization therewith. Such monomers as contain an ester linkage, as previously indicated, are to be preferred. These include the vinyl esters of monocarboxylic acids. Representative examples of this class comprise:

Unsaturated esters such as—

Vinyl acetate
Vinyl propionate
Vinyl butyrate
Vinyl succinate

Likewise, the esters of saturated alcohols such as—

Methyl alcohol
Ethyl alcohol
Propyl alcohol
Butyl alcohol
Amyl alcohol with such acids as acrylic acid, methacrylic acid; diesters of methylene malonic acid and itaconic acid containing terminal ethylenic groups are included in the preparation of interpolymers with methacrylic acid esters for use in the preparation of the novel coating materials of this invention.

The interpolymers of the acrylic acid ester and the added monomer ester may embody a relatively wide range of proportions. For example, the methacrylic acid ester component may comprise from about 50 percent to 98 percent or even 99 percent of the interpolymerizable mixture, the rest being the added monomer such as acrylic acid, vinyl butyrate, dibutyl itaconate, or one of the other monomers above mentioned.

INTERPOLYMERIZATION OF THE METHACRYLIC ACID ESTER AND THE COMONOMER

Interpolymerization may be effected by heating the mixture of components, preferably in an appropriate nonreactive medium such as water, or an organic solvent such as a mixture of acetone and toluene in the presence of a free radical initiator, such as a peroxidic catalyst.

THE EPOXY RESIN COMPONENT

Epoxy resins adapted to be incorporated with the foregoing interpolymers of methacrylic acid ester and added monomer comprise a relatively large class of materials and many patents have been issued covering the same. The following are a few of such U.S. patents: 2,582,985, 2,615,007, 2,615,008, 2,467,171.

In general, these epoxy resins comprise a polyether which is the product of condensation of a polyhydric phenol and an epoxy compound or preferably a chloroepoxy compound, such as epichlorohydrin, in the presence of an alkali adapted to effect condensation of the compounds to form polyethers. The polyethers or epoxy resins resulting from the reaction of epichlorohydrin and a diphenol substituted alkyl hydrocarbon are presently preferred. The compound known as Bisphenol A, a chemical name for a compound which is understood to be p,p'-isopropylidene diphenol, is presently the most satisfactory and most widely commercialized representative of the dihydric phenol class which may be employed in the reaction. The epoxy resin may have an epoxy equivalent of about 150 to 4,000 with a preferred range of 1,000 to 2,000.

Many epoxy resins which are satisfactory for use in the practice of the invention are now available as commercial articles and if desired, may be employed in the practice of the present invention. Such resins include the so-called Epon resins sold by the Shell Chemical Corporation and including Epon 1001, Epon 1004, Epon 1007, Epon 1009, Epon 828. The product known as Epi-Rez-540 may also be included.

THE HEAT REACTIVE PHENOLIC RESIN

Heat reactive phenolic resins which may be mixed with the epoxy resin, or are added to the interpolymer component concurrently with or subsequent to the addition of the epoxy resin, are usually condensation products of a phenol and an aldehyde and notably formaldehyde, the reaction being halted before final nonreactive, thermoset state is attained.

These materials are still capable when heated, of further homopolymerization to or toward the final thermoset, insoluble stage. They are also capable of reacting with many substances such as fatty acids, rosin acids, alkyd resins, tung oil, amines and others.

Appropriate phenols for use with formaldehyde in the preparation of the phenolic resin component comprise monohydric phenols, such as phenol per se, cresol, and the phenols comprising single hydroxyl groups and one or more hydrocarbon side chains and notably side chains containing double bonds. The monobutenyl phenols containing a butenyl group in ortho, meta or para position and where the double bond occurs between the first and second, the second and third, or third and fourth carbon atoms in the hydrocarbon chain are included. Cyclopentenyl phenols are also included. It is to be understood that saturated hydrocarbon chains such as propyl groups, butyl groups, hexyl groups, either as straight chains, or as branched chains may be substituted for hydrogen in the benzene ring. Cyclopentyl phenols (ortho, meta, or para) are also included.

Since the preparation of heat reactive phenolic resins is so exceedingly well understood by those skilled in the art, it is not deemed necessary to describe the preparation thereof. Many commercial heat reactive phenolics are available and may be used for modifying or blending with the epoxy resin component of applicants' improved coating material.

THE MIXING OF THE EPOXY AND THE PHENOLIC COMPONENTS

In the preparation of the novel coating material of this invention, the epoxy resin and the phenolic resin may be incorporated as separate entities with the interpolymer of methacrylic acid ester and added monomer, or, if preferred, the epoxy resin and the phenolic resin may be blended together in well known manner and the blend then incorporated with the interpolymer.

The heat reactive phenolic component may be employed in a proportion approximately within a range of 10 to 60 percent based upon the mixture thereof with epoxy resin component.

The blend of epoxy resin and phenolic resin may be incorporated with the interpolymer of methacrylic acid ester and added monomer in a relatively broad range of proportions.

PROPORTIONS OF INTERPOLYMER, EPOXY RESIN AN PHENOLIC RESIN

The interploymers of methacrylate esters may be incorporated with varying proportions of the epoxy resins and phenolic resins of the heat reactive type, a range of about 50 percent to 95 percent of the copolymer of methacrylic acid ester and added monomer is contemplated with the preferred range being from about 75 percent to about 90 percent. The rest of the mixture is the blend of epoxy resin and heat reactive phenolic resin.

The epoxy resin preferably is employed in an amount of about 50 to 90 per cent by weight based upon the combined weights of epoxy resin and phenolic resin. Upon a like basis, the amount of phenolic resin is 10 to 50 percent by weight. If modifying resins, synthetic rubbers or other components are included in the mixture, departures from these proportions may be desirable.

MODIFICATION OF THE BLEND

The blends of methacrylic acid ester, epoxy resin and heat reactive phenolic resin may be used in many coating applications as for instance in the relatively exacting use as a primer under plastisol films without further modification. However, in those instances where the film is to be subjected to severe flexing or even stretching or compressing in the shaping of pre-coated sheet metal articles, or the like, it is sometimes desirable to include an added component or modifier designed to increase the elongation of the cured films. Appropriate agents of this type comprise synthetic rubber such as the so-called "Hycars" sold by the B. F. Goodrich Rubber Company. This material is understood to comprise a rubbery interpolymer of butadiene and acrylonitrile. The proportion of the two components of the interpolymer, it is understood, may be varied in order to obtain almost any reasonably desired degree of elongation of the material. Uusually the copolymer will comprise at least 50 percent by weight of butadiene, the rest being essentially acrylonitrile.

Still another modifier designed to improve the capacity of the films of methacrylic acid interpolymer-epoxy resin-phenolic resin blend to withstand the severe flexing compression and extension involved in the sheet metal fabrication, comprises interpolymers of vinyl chloride and vinyl acetate as represented by the commercial products sold as VMCH. The latter is understood to comprise 86 percent of vinyl chloride and 13 percent of vinyl acetate. The material is also understood to include about 1 percent of interpolymerized maleic acid.

The compositions as herein disclosed may be employed as priming coatings or as intermediate coatings or as finish coatings. The use of the material as a priming coating for plastisols has been emphasized merely because the latter often place such severe requirements upon the priming coating, at least for many applications and the composition of this invention is outstandingly successful as a primer for this material.

The materials of this invention may be applied by spraying, by brushing, by roller coating, dipping or by any other convenient conventional technique. In those instances in which the material is to be employed as a primer coating for a plastisol finishing film, the films may be of relatively slight thickness, e.g. from about 0.1 mil to 1 mil, though of course thicker films are also permissible.

CURING THE FILMS

Cure may be effected either by a quick bake at a temperature within a range of about 150° F. to 400° F. or by evaporation of solvents from solutions of materials in the films at much lower temperature, for example atmospheric or room temperatures, over a longer period, for example about 30 minutes. Bakes at about 350° C. are especially suitable for the formation of films which are highly resistant to salt spray and caustics. At these temperatures, a cure of about 5 minutes is satisfactory.

The preparation of interpolymers of esters of methacrylic acid and added monomers are illustrated by the following examples. These interpolymers may be compounded with epoxy resins and heat reactive phenolic resins in accordance with the provisions of the present invention.

Example A

In accordance with this example, a mixture is prepared comprising 80 percent by weight of methyl methacrylate and 20 percent by weight of vinyl butyrate. The mixture is dissolved in a system comprising 30 percent acetone and 70 percent toluene the solution being of a concentration of 50 percent by weight of interpolymerizable components. The mixture is initially catalyzed with a peroxygen catalyst as represented by benzoyl peroxide. The mixture is refluxed for 2 hours and at the conclusion of that time, 0.2 percent by weight based upon the mixture of additional benzoyl peroxide is incorporated and the mixture is then further refluxed for 2 hours, at which time a second increment of 0.2 percent by weight based upon the mixture of benzoyl peroxide is added and refluxing is continued for a further period of 2 hours, at which time a third increment of the benzoyl peroxide is incorporated. Refluxing is continued for a total of 8 hours. At the conclusion of that time, the mixture is cut with toluene to a 33 percent by weight solids content in 85 percent toluene and 15 percent acetone and is suitable for blending with epoxy resin and heat reactive phenolic resin in accordance with the provisions of this invention.

Example B

This example illustrates the preparation of an interpolymer of methyl methacrylate and dibutyl itaconate. The interpolymerizable mixture comprises 80 percent by weight of methyl methacrylate and 20 percent by weight of dibutyl itaconate. This mixture is dissolved in toluene and acetone (same concentration as in Example A) to provide a solution of 50 percent concentration. Benzoyl peroxide is again employed as the catalyst but could be replaced by other addition polymerization catalyst and notably of the peroxygen or hydroperoxygen type. The benzoyl peroxide is employed in an amount of 0.4 percent by weight based upon the mixture. The refluxing schedule is the same as that described in connection with Example A and catalyst is added in the increments specified in the former example at intervals of 2 hours. The interpolymer product is diluted with toluene as described in Example A and is suitable for incorporation with an epoxy resin and a reactive phenolic resin to provide a useful coating medium.

Example C

In accordance with this example, methyl methacrylate and methacrylic acid are interpolymerized as a suspension in water. The methacrylic acid comprises 2.5 to 5.0 percent by weight of the interpolymerizable mixture. The mixture is incorporated in a concentration of 25 percent by weight with water. The catalyst is again a peroxygen catalyst, namely benzoyl peroxide, in a concentration of 25 percent by weight with water.

Other agents, such as dispersing agents, thickeners, protective colloids or suspending agents, and the like, may also be included. One appropriate dispersing agent which may be used comprises 3 percent of a commercial product sold as Cyanamer-370 which is modified sodium polyacrylate; polyvinyl alcohol, polyacrylamide or sodium polyacrylates may also be employed. The mixture is heated at 80° C. for 3 hours and is then filtered and washed. The mixture may include tertiary dodecyl mercaptan, or other modifiers, as chain stoppers.

The mixtures herein disclosed may be made up with solvents for epoxy and phenolic resins to provide solutions of desired viscosity and solids content. Nonreactive pigments may also be added. Red lead, or dichromates in an amount of about 1 to 15 percent are efficient in increasing the resistance of the films to sale spray and such like agencies of deterioration.

THE PLASTISOL

An appropriate plastisol material for application over the primer compositions disclosed in the examples to follow comprises polyvinyl chloride in finely pulverulent form dispersed in appropriate plasticizer, such as an organic ester of a carboxylic acid. Commercial embodiments of polyvinyl chloride are sold under the trade names of Vinylite QYNV, Geon 121, etc. These readily disperse in the ester plasticizers such as those herein disclosed. Plasticizers in which the polyvinyl chloride may be dispersed may be divided into two main classes, Primary and Secondary. These are often used in combination. The Primary plasticizers have considerable capacity for dissolving polyvinyl chloride and are of assistance in promoting the fusion of the particles of plastic to form a continuous film. The Secondary plasticizer has a lower action as a solvent. These help maintain high fluidity in the dispersion on ageing. The proportion thereof with respect to the Primary plasticizer is often as high as possible, consistent with producing a suspension in which the particles of plastic will readily fuse when the films are heated. The following is a list of Primary and Secondary plasticizers, which may be used in formulating plastisols adapted for use in practicing this invention:

PLASTISOL PLASTICIZERS

PRIMARIES (GOOD SOLVENTS FOR POLYVINYL CHLORIDE)

| Trade Name | Chemical Type | Appearance | Supplier |
|---|---|---|---|
| GP-261 | Dioctyl phthalate ester | Water white liquid | B. F. Goodrich Chemical Co. |
| Plastolein 9058 | Di-2-ethylhexyl Azelate | do | Emery Industries, Incorporated. |
| KP-220 | Capryl Glycollate | Yellow liquid | Ohio Apex, Incorporated. |
| Hercoflex 250 | Phthalate ester | Water white liquid | Hercules Powder Company. |
| A.T.B.C. | Acetyl Tributylcitrate | do | Chas. Pfizer & Company. |
| Cabflex DIOZ | Diisooctyl Azelate | Yellow liquid | Godfrey L. Cabot. |
| Paraplex G-62 | Polymeric epoxidized Oil | do | Rohm & Haas. |
| Admex 710 | Epoxy | do | Archer-Daniels-Midland. |
| Plastoflex MGB | Polypropylene Glycol | do | Advance Solvents & Chemical Co. |
| PX-114 | Decylbutyl Phthalate | Water white liquid | Pittsburgh Coke & Chemical Co. |
| Morflex P-30 | Semi-polymeric (polyester) | do | Morton-Withers. |
| Morflex P-40 | Polyester | Yellow liquid | Do. |
| Morflex #410 | Di-2-ethylhexyl Azelate and Tricresyl phosphate. | Water white liquid | Do. |

SECONDARIES (POOR SOLVENTS FOR POLYVINYL CHLORIDE)

| Trade Name | Chemical Type | Appearance | Supplier |
|---|---|---|---|
| GP-261 | Phthalate | Water white liquid | B. F. Goodrich Chemical Co. |
| Flexricin 66 | Ricinoleate | do | Baker Castor Oil Company. |
| Staflex LA | Sebacate/Adipate | Yellow liquid | Deecy Products Incorporated. |
| Staflex MP | Dialkyl Phthalate (Mixed Alcohol) | do | Do. |
| Plastoflex FE-6 | Fatty ester | do | Advance Solvents & Chemical Company. |
| Admex 710 | Epoxy | do | Archer-Daniels-Midland Company. |
| Carbol 100 | Aromatic Hydrocarbon | Brown liquid | Godfrey L. Cabot. |
| Hercolyn | Methyl Ester | Yellow liquid | Hercules Powder Company. |
| Pycal 170 | Fatty Acid | Orange liquid | Atlas Powder Co. |
| Benzoflex 9-88 | Glycol Dibenzoate ester | Water white liquid | Tennessee Product & Chemical Co. |
| Chloroparaffin #4004 | Chlorinated Paraffin | Yellow liquid | Halowax Product Co. |
| Paraplex G-53 | Polymeric Ester | do | Rohm & Haas. |
| Conoco H-340 | Petroleum hydrocarbon | do | Continental Oil Co. |
| Golden Bear Oil | do | Greenish Brown liquid | Harwick Standard Company. |
| Solvaloid C | High boiling Petroleum hydrocarbon. | Oil | Socony Mobil Oil Company. |
| MG1 | Polyethylene glycol dimethacrylate | Liquid | Carbide & Carbon. |

Another class of compounds which function as plasticizers in the preparation of plastisols may be designated generically as acryloxy- or methacryloxy-methyl-benzenes. They comprise one or a plurality of the groups

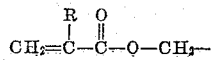

attached to an aromatic nucleus such as those of toluene, xylene or mesitylene. The group R preferably is hydrogen or methyl. These have been disclosed as compounds in a copending application Serial Number 557,431, filed January 5, 1956, now abandoned. They may be prepared conveniently by reacting a halomethylbenzene, such as chloromethyl benzene with an alkali metal salt such as sodium or potassium salts of acrylic or methacrylic acid.

Compounds of this class are represented by:

(1) Dimethylbenzyl methacrylate which can exist in isomeric forms, but usually is on of the following:

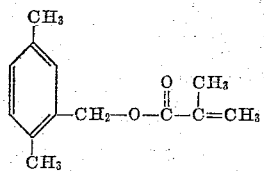

or

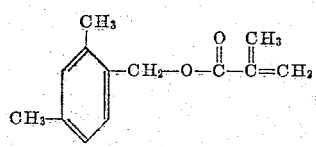

The latter isomer usually predominates. In the foregoing application, the first of these compounds has been designated as 1,4-dimethyl-5-methacryloxymethyl-benzene, or 2-methacryloxymethyl-p-xylene. By analogy, the second could be designated as 1,3-dimethyl-4-methacryloxymethyl-benzene or 2-acryloxymethyl-m-xylene.

(2) A second group of compounds of this class as disclosed in application Serial Number 557,431, has been designated broadly as alpha, alpha'-durenediol diacrylates and alpha,alpha'-durenediol dimethacrylates and being represented by 1,5-dimethyl, 2,4-dimethacryl-oxymethyl-benzene of the formula:

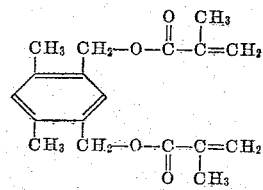

This may also be termed alpha$^3$, alpha$^5$-durenediol dimethacrylate or 3,5-acryloxymethyl-m-xylene. For convenience, this compound and isomers thereof may be referred to as durenediol dimethacrylates.

These compounds can be incorporated with pulverulent polyvinyl chloride to provide liquid dispersions which can be spread upon substrates of various types and are adapted for application to panels of ferrous metals or other surfaces which have been primed with the methylmethacrylate-epoxy resin-phenolic resin combinations herein disclosed.

Other plasticizers such as dioctyl phthalate may also be included in the compositions.

It is thus possible to provide plastisols of low viscosity and being well adapted for coating operations but which when cured, are hard and durable.

Stabilizers of plastisols, such as epoxy resins, tin laurate, lead salts, cadmium salts, or the like may also be included in the plastisol and are often desirable if the plastisol is to be baked at a substantial temperature or stored for a substantial period of time.

The following constitutes an example of plastisol composition which is adapted for applying as a finishing film over coatings as disclosed in the several examples illustrating primers. The primers may be applied upon substrates of steel, aluminum, magnesium, chromium and alloys thereof, or other material.

Example D

| | Pounds |
|---|---|
| Polyvinyl chloride (Geon 121) | 550 |
| Dioctylphthalate | 332 |

To these may be added smaller amounts of modifiers designed to tailor or refine the material for specific applications. Examples of minor ingredients comprise an epoxidized oil plasticizer, such as Paraplex G-62, which may be used in an amount of 83 pounds; stabilizers, e.g. Advastab-T-22; pigments, such as titanium dioxide and iron dioxide. While these minor constituents may be desirable in some applications, none of them is essential.

This plastisol composition is given by way of illustration. It can be replaced by others comprising polyvinyl chloride particles suspended in a plasticizer or mixture thereof to provide a liquid dispersion that can be applied to a primed surface and which, when heated, is fused to a homogeneous state.

Example E

A second plastisol composition suitable for use upon sheet steel which has been primed with an interpolymer of (1) methyl methacrylate and monomer and (2) a blend of an epoxy resin and a heat reactive phenolic resin comprises:

| | Parts by weight |
|---|---|
| Geon 121 (polyvinyl chloride) | 440 |
| Adipic acid esters | 190 |
| Dioctyl phthalate | 190 |
| Calcium carbonate (pigment) | 128 |

The mixture is stabilized with a commercial stabilizer as is customary in the art. One suitable stabilizer comprises a mixture of an epoxy resin such as Epon 828 and white lead.

Example F

The plastisol composition of this example is useful for application over a primer such as is described in Examples I through V and VII through X, upon a ceramic material such as a sewer pipe. The plastisol comprises:

| | Pounds |
|---|---|
| Polyvinyl chloride (Geon 121) | 301 |
| Calcium carbonate (pigment) | 265 |
| Diisodecyl phthalate | 150 |
| Diisodecyl adipate | 20 |
| Solvaloid C | 279 |

Example G

In accordance with this example, dimethylbenzyl methacrylate as previously described is employed as a heat reactive plasticizer in polyvinyl chloride. The dimethylbenzyl methacrylate may be prepared in the manner described in the aforementioned copending application 557,431, a mixture being prepared comprising:

| | Grams |
|---|---|
| Monochloromethyl xylene | 77.2 |
| Potassium salt of methacrylic acid | 68.3 |
| Hydroquinone | 5 |
| Methacrylic acid | 70.0 |
| Dimethyl formamide | 150.0 |

In this formulation, the hydroquinone is employed as an inhibitor of polymerization of the reactants and the monomeric reaction product. Other inhibitors of polymerization of acrylic compounds could be substituted therefor. The methacrylic acid and dimethyl formamide constitute a non-reactive solvent system and could be replaced by other compounds having like function.

The reaction mixture is continuously agitated and refluxed for two hours. Potassium chloride separates as the reaction progresses. The reaction mixture is cooled and a clear brown liquid layer is separated from the solid potassium chloride. The potassium chloride is removed by filtering and the reaction mixture is washed with additional dimethyl formamide. The filtrate containing the product, is washed with water and toluene is then added to dissolve the product layer. The toluene-soluble layer is washed repeatedly with water until it is neutral and it is then dried over anhydrous sodium sulfate and distilled at reduced pressure. A nearly quantitative yield of dimethylbenzyl methacrylate is obtained. This has a boiling point of 105° C. to 111° C. at 1.3 millimeters of mercury absolute pressure and refractive index of $n_D{}^{23}=1.5120$. Its structure is:

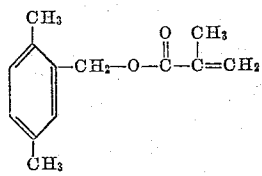

This is added to polyvinyl chloride to form a plastisol.

Example H

This example illustrates the preparation of an alpha, alpha'-durenediol dimethacrylate. A reaction charge is prepared comprising:

| | Grams |
|---|---|
| Dichloromethyl xylene | 105.5 |
| Potassium methacrylate | 131.5 |
| Hydroquinone | 15 |
| Methacrylic acid | 131.5 |
| Dimethyl formamide | 200 |

The function of the hydroquinone, methacrylic acid and dimethyl formamide are the same as in Example XI. The reaction is conducted at reflux temperature for two hours. The potassium chloride formed, settles to the bottom of the reactor and the product, (a supernatant layer) is a golden reddish brown color. This layer is separated by decanting; the salt (potassium chloride) is removed therefrom by filtering. The salt is washed with dimethyl formamide and the filtrate is added to the decanted layer and placed in a separatory funnel. When dried, it weighs 73 grams. The theoretical yield of potassium chloride is 74.56 grams, therefore, the foregoing yield is almost quantitative. To the layer in the separatory funnel, 500 milliliters of toluene are added and the mixture is repeatedly washed to obtain neutrality. The toluene layer is then dried over anhydrous sodium sulphate and is distilled to give an excellent yield of the desired product (alpha,alpha'-durenediol dimethacrylate).

Example Ha

This example illustrates the preparation of alpha$^2$, alpha$^4$-durenediol diacrylate using techniques similar to those already described. The reaction mixture comprises:

| | Grams |
|---|---|
| Dichloromethyl xylene | 27.9 |
| Potassium acrylate | 28.9 |
| Hydroquinone | 3 |
| Acrylic acid | 29.9 |
| Dimethyl formamide | 100.0 |

The functions of the hydroquinone, acrylic acid and dimethyl formamide are the same as in Examples G and H.

The reactants are refluxed with agitation for 20 minutes, potassium chloride and a brown supernatant layer being formed. The layer is taken up in toluene, washed with water to neutrality and dried over anhydrous sodium sulphate. A quantitative yield of potassium chloride is obtained, indicating complete coupling of the dichloromethyl xylene and the potassium acrylate. The liquid layer dissolved in toluene, is washed with water to neutrality. It is then treated with a small amount of sodium hydrosulphate, to convert the quinone formed to hydroquinone. The hydroquinone is then removed by washing the solution with dilute sodium hydroxide and the solutions are subjected to vacuum to remove the toluene thus providing alpha$^2$,alpha$^4$-durenediol diacrylate in excellent yield.

The Examples G, H and Ha are illustrative of the preparation of reactive plasticizers of this invention. The same or similar techniques may be employed to prepare other compounds which are also plasticizers for polyvinyl chloride and are heat polymerizable in the mixtures to give hard durable materials.

*Example J*

In accordance with the provisions of this example, polyvinyl chloride in finely divided form is converted into a plastisol composition by the agency of durenediol dimethylacrylate. The polyvinyl chloride employed is the commercial product known as Geon–121 already referred to. The following series of plastisol compositions are prepared and sandwiched between glass plates having coatings of a parting agent such as a silicone resin. The sandwiches are subsequently baked at 325° F. for 30 minutes to effect fusion. The glass is stripped off and the sheets are tested.

TEST A

This composition comprises:

| | Parts by weight |
|---|---|
| Durenediol dimethylacrylate | 83.5 |
| Polyvinyl chloride | 100.0 |
| Dioctyl phthalate | 16.7 |
| Benzoyl peroxide | 2.5 |

The films obtained are clear and of a hardness of 97 which is very good. The hardness in this and subsequent tests are Shore Durometer A hardnesses.

TEST B

The composition in this test comprises:

| | Parts by weight |
|---|---|
| Durenediol dimethylacrylate | 83.5 |
| Polyvinyl chloride | 100.0 |
| Dioctyl phthalate | 16.7 |
| Cumene hydroperoxide | 2.5 |

The curing schedule is the same as in Test A.
The films are clear and of a Shore hardness of 95.

TEST C

The mixture comprises:

| | Parts by weight |
|---|---|
| Durendiol dimethylacrylate | 66.7 |
| Polyvinyl chloride | 100.0 |
| Dioctyl phthalate | 6.7 |
| Benzoyl peroxide | 2 |

The curing schedule is the same as that above described. The hardnes is 95.

TEST D

In this test, durenediol dimethylacrylate is replaced by a commercial polyethylene glycol dimethacrylate known as MG–1 to provide a control. The composition comprises:

| | Parts by weight |
|---|---|
| Polyvinyl chloride | 100 |
| Polyethylene glycol dimethacrylate | 66.7 |
| Dioctyl phthalate | 6.7 |
| Benzoyl peroxide | 2 |

Sandwiches containing this material are cured at 325° F. The resultant films are of a hardness of 96, but are dark in color. Material containing the durenediol dimethacrylate is substantially superior, in color when cured, than the material containing the conventional polyethylene glycol dimethacrylate. Its use as a reinforcement in safety glass is suggested.

The plastisols containing durendiol dimethacrylate in accordance with the provisions of this example, can be applied over substrates such as metal panels which have been primed with blends of polymers of methyl methacrylate, epoxy resins and phenolic resins. When these panels are cured, the surfaces obtained are clear, hard and durable. Durenediol dimethacrylate in this example, can be replaced by durenediol diacrylate.

*Example K*

In accordance with the provisions of this example, dimethylbenzyl methacrylate such as already has been described, is employed as a plasticizer for polyvinyl chloride which is again the commercial product known as Geon-121. The following tests are conducted:

TEST A

A composition was prepared comprising:

| | Parts by weight |
|---|---|
| Polyvinyl chloride | 100 |
| Dioctyl phthalate | 6.7 |
| Benzoyl peroxide | 2.5 |
| Dimethyl benzyl methacrylate | 66.7 |

The mixture is spread between two glass plates coated with a parting agent such as silicone resin, and is cured for 30 minutes at 325° F. When the sheet is stripped of the glass plates, it is found to be of a hardness of 88 but slightly cloudy.

TEST B

In this test, a mixture is prepared comprising the following components:

| | Parts by weight |
|---|---|
| Polyvinyl chloride | 100 |
| Dimethylbenzyl methacrylate | 40 |
| Dioctyl phthalate | 4 |
| Cumene hydroperoxide | 2 |

Samples of this material are cured between glass plates at 325° F. for 30 minutes provided clear sheets of a hardness of 90. Hardness as herein indicated is Shore Durometer A hardness.

The mixtures containing dimethylbenzyl methacrylate as a plasticizer could be applied to surfaces primed with the mixtures of methyl methcrylate, epoxy resin, and phenolic resin disclosed in Examples I–X and cured to provide valuable surface coatings.

The following examples illustrate the blending of methyl methacrylate-monomer interpolymers with an epoxy resin and a heat reactive phenolic resin to provide a film forming material.

*Example 1*

In accordance with this example, a commercial epoxy resin, sold as Epon 1007 is employed. This resin is understood to be a polyether of epichlorohydrin and p,p'-isopropylidene diphenol, or, as it is more commonly known, Bisphenol-A. In the formulation, a solution of the epoxy resin is prepared comprising:

EPOXY RESIN SOLUTION

| | Pounds |
|---|---|
| Epon 1007 | 414 |
| Methyl isobutyl ketone | 165 |
| Cellosolve acetate | 165 |
| Xylol | 82.5 |

The phenolic component is a commercial product sold under the trade name of BV–1600 which is understood to be a 54 percent by weight solution of a heat reactive phenol-formaldehyde resin in ethanol. The interpolymer is the same as that of Example A, namely, a 33 percent by weight solution of the interpolymer of methyl methacrylate and vinyl butyrate in solution in a medium which comprises 85 percent toluene and 15 percent acetone (percent by weight). The composition of the blend is as follows:

| | Pounds |
|---|---|
| Epoxy resin solution (as above described) | 30 |
| Phenolic resin solution (BV–1600) | 16 |
| Methyl methacrylate-vinyl butyrate (33 percent solution in 85 percent toluene and 15 percent acetone) | 464 |
| Methyl ethyl ketone | 115.5 |
| Ethyl alcohol | 139 |

This mixture constitutes 100 gallons by volume. It is to be noted that the mixture is subjected to agitation during the addition of the alcohol component. This mixture can successfully be applied to steel, magnesium, aluminum, or to ceramic bodies such as clay pipe to mention a few of the more difficult applications and, of course, to many other less difficult applications.

The solutions as described can be applied undiluted to a substrate, for example by brushing, spraying, or dipping or if prefered, they may be further diluted to any desired working concentration in order to promote application.

Sheet steel samples are partially coated with the mixtures to a thickness of about 0.1 to 1 mil to form primer coats. These may be dried at atmospheric temperatures over a period of about 30 minutes, or they can, as previously indicated, be baked at higher temperatures to effect fusion of the vinyl chloride particles in a relatively short time, e.g. 5 minutes, thus forming strongly adherent, homogeneous films.

A substrate, or a portion thereof, namely a sheet of steel, a clay pipe or the like is coated with the blend of (1) interpolymer of methyl methacrylate and monomer, such as vinyl butyrate, dibutyl itaconate, or methacrylic acid (2) an epoxy resin (3) a heat reactive phenolic resin as formulated and is cured by baking at about 350° F. for approximately 5 or 10 minutes. The film thus applied constitutes a priming coating to which a plastisol finishing coating, such as the material of Examples D or E, may successfully be applied.

The film is fused to a homogeneous state. Those portions, of polyvinyl chloride and plasticizer upon the primer, of the surface which has been primed with the blend of interpolymer, epoxy resin and phenolic resin are firmly cohered with the cured plastisol film. If a part of the metal is left unprimed, the plastisol film does not adhere, or adheres but weakly to the unprimed portions.

*Example II*

The interpolymer of methyl methacrylate of this example comprises dibutyl itaconate as the monomer. The epoxy resin is the same as that of Example I, as is the heat reactive phenolic resin component. The mixture is of the following composition:

| | | |
|---|---|---|
| Epon 1007 (solution as in Example I) | pounds | 26.2 |
| Phenolic resin solution (BV–1600) | do | 19.5 |
| Interpolymer of 80 percent by weight methyl methacrylate and 20 percent by weight of dibutyl itaconate as a 33 percent solution in 85 percent toluene and 15 percent acetone parts by weight | | 417.5 |
| Methyl ethyl ketone | do | 139 |
| Ethyl alcohol | do | 139 |

The alcohol is added while the mixture is subjected to agitation. Test panels of sheet steel are primed with this material in a film of about 0.1 to 0.8 mil thickness. When portions of the metal of each panel are left bare and the panels are coated with films of a plastisol prepared as above described, and the films are baked, good adhesion is obtained to the primed surface, but there is but little or no adhesion to the unprimed surface.

*Example III*

This example illustrates the preparation of a composition well adapted for use in the priming of sheet steel or tin plate such as is employed in the fabrication of bottle caps. The surface of the metal may be primed, cut to provide blanks and the blanks may be shaped to final form through severe distortion or stretching of the metal without breakage of the film and loosening or chipping of the priming film from the surface. The interpolymer of this example comprises the interpolymer of 80 percent of methyl methacrylate and 20 percent of vinyl butyrate. The epoxy resin-phenol resin blend comprises 65 parts by weight of the epoxy resin solution of Example I (Epon 1007) and 35 percent by weight of heat reactive phenolic solution, namely BV–1600.

An additive for increasing the flexibility of the films of this material comprises an interpolymer of butadiene and acrylonitrile, sold commercially by the B.F. Goodrich Company as Hycar 1432. The priming composition in this instance comprises:

| | Parts by weight of solution |
|---|---|
| Epoxy resin-phenol resin solution | 2 |
| Methyl methacrylate-vinyl butyrate interpolymer solution | 11.5 |
| Hycar 1432 15% solution in methyl ethyl ketone | 27 |

Hycar 1432 is understood to comprise a rubbery interpolymer of about 55 to 67 parts by weight of butadiene the rest being essentially acrylonitrile.

Films of this material applied to black iron plates or sheets, withstand cutting of blanks and subsequent shaping of the blanks for example, to form tops and bottoms of tin cans, or bottle caps, without chipping. A plastisol coating material can be applied over the surface of the primed surface of the metal and when cured, for example by baking at 300° F. to 400° F., the plastisol, such as is described in Example D, adheres sucessfully to the priming coating and the latter maintains its adhesion to the metal substrate. This is a severe test. Most priming compositions that will adhere to the metal and to the plastisol finishing coat fail in the fabrication of the tin plate. Hycar 1432 may be replaced by Chemigum N–6B.

*Example IV*

In this example, the copolymer of vinyl chloride and vinyl acetate comprising 86 percent by weight of the vinyl chloride and 13 percent by weight of vinyl acetate modified with 1 percent of interpolymerized dibasic acid. The resin is known as Vinylite VMCH and is employed as an agent for increasing the extensibility of the priming coating material, as herein described. Other vinylite resins such as VYHH or VAGH may be used.

The solids composition comprises 7 parts by weight of Vinylite VMCH, 1.6 parts by weight of interpolymer solids of methyl methacrylate and vinyl butyrate as described in the preceding Example I. These are mixed with 4 parts of blend of 65 percent by weight of Epon 1007 and phenolic resin solids (BV–1600), 35 percent by weight. This mixture when applied and baked as a primer to sheet steel successfully withstands such fabrication operations as cutting and pressing to form bottle caps. The primer films upon the shaped articles can then be coated with a plastisol and cured by baking at 300° F. to 400° F. to provide coatings which are strongly adherent to the metal and which withstand the action of chemical agents such as salt sprays and the like.

*Example V*

In accordance with this example, a phenolic resin is prepared comprising butenylphenols (mainly ortho and para isomers). A method of preparing such phenolic resin is disclosed in a copending application to Roger M. Christenson et al., Serial Number 390,089, filed November 3, 1953, now Patent No. 2,843,566.

A reaction mixture as disclosed in the application is as follows:

| | Parts by weight |
|---|---|
| Monobutenylphenols | 148 |
| Sodium hydroxide | 10 |
| Water | 100 |

The foregoing are mixed under a nitrogen atmosphere while the temperature is maintained below 35° C. When a homogeneous solution is obtained, 162 parts of 37 percent formalin (methanol free) and containing 60 grams (2 moles) of solid formaldehyde are added at a moderate rate. The mixture is cooled to keep the temperature below about 35° C. Stirring is continued for about 48 hours at room temperature. At the end of this time, the reaction mixture is acidified to a pH of 5 with a mixture of concentrated hydrochloric acid and water (50 percent acid and 50 percent water) and the resulting water insoluble layer of resin is washed four times with luke warm water. The resin is then dehydrated by vacuum stirring at steam bath temperatures under 20 to 50 millimeters of mercury pressure (absolute). This resin is completely miscible with methanol, butanol, toluene and xylene and is heat reactive.

It may be substituted in any of the Examples I, II, III, IV, V, VII, VIII, IX and X. The following procedure is illustrative of a formulation of this type of phenolic resin with epoxy resin and an interpolymer of an ester of methacrylic acid and an added monomer. The epoxy resin solution and the solution of the interpolymer of methyl methacrylate and added monomer are the same as in Example I.

The mixture comprises:

| Resinous components | Parts by Weight |
|---|---|
| butenylphenol resin (70 percent solution in butanol) | 1.75 |
| epoxy resin solution (50 percent solution) | 4.5 |
| methyl methacrylate+vinyl butyrate copolymer solution (33 percent solution in toluene-acetone) | 11.0 |
| 15 percent solution Hycar 1432 (methyl ethyl ketone solution) | 26.0 |
| Vinylite VMCH (20 percent solution in methyl ethyl ketone) | 35 |

The resinous components are then diluted to the desired working viscosity with the following solvent mixture.

| Solvents | Percent by Weight |
|---|---|
| Ethyl Cellosolve (monoethyl ether of ethylene glycol) | 50 |
| acetone | 25 |
| mesityloxide | 25 |

The mixture is spread upon a steel plate and baked at 400° F. for 10 minutes, the film is useful as such, or it can be employed as a primer for a plastisol film of polyvinyl chloride and dioctyl phthalate.

*Example VI*

Butenylphenol resin is prepared from a mixture comprising:

| | Pounds |
|---|---|
| Butenylphenol | 24.6 |
| Formaldehyde solution (37 percent aqueous solution) | 27.0 |
| NaOH 50 percent aqueous solution | 5.0 |
| Sodium hydrosulfite | 0.12 |

The mixture is agitated and held to 75° F. to 80° F. for 5 hours and is allowed to stand for 43 hours. It is then acidified to a pH of 5 with 68 percent sulfuric acid and is allowed to settle. The water and salt layer is drawn off and discarded. The wet resin is treated with 0.04 pound of ethylene diamine tetraacetic acid, and is blown with inert gas ($CO_2$) at 210° F.–215° F. to a viscosity of U to V (Gardner-Holdt) at 75 percent solids. This material can be employed as the heat reactive phenolic resin component in the preceding examples. The resin is thinned with butanol to 70 percent solids and is filtered at 110° F. It has a viscosity of U to W and can be used as the heat reactive phenolic resin in Examples I through V, and VIII through X.

*Example VII*

A coating material which has excellent adhesion to iron or steel and is well adapted for priming the latter, as well as for other uses comprises:

| | Grams |
|---|---|
| Phenolic resin solution (BV–1600) | 67.2 |
| Methyl ethyl ketone | 487.2 |
| Epoxy resin solution (as per Example I) | 126 |
| Solution of methyl methacrylate-vinyl butyrate copolymer (as per Example I) | 1,949.0 |
| Ethyl alcohol | 738 |

This material, when applied as a priming coating to tin plate, can be baked at 350 F. or thereabout. It has excellent adhesion to the metal as well as to the plastisol finishing films applied thereto.

*Example VIII*

The material of this example has good adhesion to sheet steel and to tin plate. It has high flexibility and films thereof upon tin plate or the like, are adapted to withstand fabrication. The methyl methacrylate interpolymer of this example, comprises the interpolymer of 80 percent by weight methyl methacrylate and 20 percent by weight of vinyl butyrate. The interpolymerization is preferably effected in an aqueous medium but can also be effected in solution. The interpolymer is employed as a 33 percent by weight solution in methyl isobutyl ketone. The epoxy resin (Epi–Rez–540) and the heat reactive phenolic resin as BV–1600 are made up in 65–35 ratio and are dissolved in methyl isobutyl ketone to provide a solution of 50 percent by weight solids content. The Hycar 1432 is employed as 15 percent by weight solution in methyl isobutyl ketone.

The priming composition comprises:

| | Grams |
|---|---|
| Vinylite VMCH solution (20 percent in methyl isobutyl ketone) | 35 |
| Interpolymer of methyl methacrylate and vinyl butyrate solution (33 percent solids) in methyl isobutyl ketone as per Example I | 11 |
| Solution of epoxy resin and phenolic resin (65 percent epoxy resin — 35 percent phenolic resin. Fifty percent solution) | 7 |
| 15 percent solution of Hycar 1432 | 26.7 |

To this mixture is added 19 grams of a solvent mixture comprising mesityl oxide (25 percent by weight), acetone (25 percent by weight), monoethyl ether of ethylene glycol (50 percent by weight). The foregoing mixture is applied to tin plate as a priming film and is cured for 10 minutes at 400° F. It adheres well to the metal and withstands many fabrication operations in which the metal is substantially distorted or stretched. The films, when used as a primer, can be coated with a finishing coat of plastisol of polyvinyl chloride and a plasticizer as for example as described in Example I. The plastisol coat may be fused at 370° F. for 4 minutes to obtain homogeneity. The adhesion between films is excellent. The films withstand boiling in water quite well.

*Example IX*

This example illustrates the use of Hycar 1432 as a modifier of a blend of (1) interpolymer of methyl methacrylate and vinyl butyrate (as per Example I) (2) epoxy resin (Epi–Rez–540) and (3) heat reactive phenolic resin (BV–1600). The Epi-Rez–540 and the BV–1600 are employed as a 50 percent solution in methyl isobutyl ketone, of a blend of 65 percent of the Epi-Rez–540 and 35 percent of the BV-1600. The priming composition comprises:

| | Grams |
|---|---|
| Solution of interpolymer | 35 |
| Solution of blend | 4 |
| Monobutyl ether of ethylene glycol | 10 |
| Alcohol | 10 |
| Hycar 1432 solution (20 percent in methyl isobutyl ketone) | 20 |

To this solution is added 20 additional grams of methyl isobutyl ketone. This composition is used to prime tin plate or other metal for reception of polyvinyl chloride plastisol solutions. It adheres well to the metal and to the finishing coat. It successfully withstands soaking in water over a period of several days. Priming coatings having the foregoing composition successfully withstand the fabrication operations to which the metal is often subjected.

*Example X*

This examples illustrates the use of a butadiene-acrylonitrile interpolymer to modify a blend of (1) an interpolymer of 80 percent by weight of methyl methacrylate and 20 percent by weight of dibutyl itaconate (2) epoxy resin (3) heat reactive phenolic resin. By such modification the resistance of the films of the material due to failure of fabrication is increased. The blend of epoxy resin and phenolic resin is the same as that in Example IX and is employed as a 50 percent solution in methyl isobutyl ketone as a solvent. In the practice of the invention, a primer solution is made up to comprise:

| | Grams |
|---|---|
| Solution of interpolymer (33 percent solids) | 35 |
| Solution of epoxy-phenolic resin blend (50 percent solids) | 4 |
| Solution of Hycar-1432 (20 percent solids) | 20 |

Additionally there are incorporated as solvent media:

| | Grams |
|---|---|
| Methyl ethyl ketone | 10 |
| Ethyl alcohol | 10 |
| Monoethyl ether of ethylene glycol | 6 |

Panels of sheet steel such as so-called "black iron" are primed with this composition and then receive finishing coats of a plastisol, namely one sold commercially as Unichrome 5300. The panels are then baked to provide homogeneous coatings. The primer again has excellent adhesion to the metal and also to the finishing coat. The metal having the priming coating, in accordance with this example, can be pressed to concave or cup form as for instance to provide bottle caps. The primer maintains its adhesion during such operation thus permitting pre-priming of the sheet metal prior to the cutting and forming of the same into the articles.

For further illustration of the application of the invention reference may now be had to the drawings in which.

Figure 1:
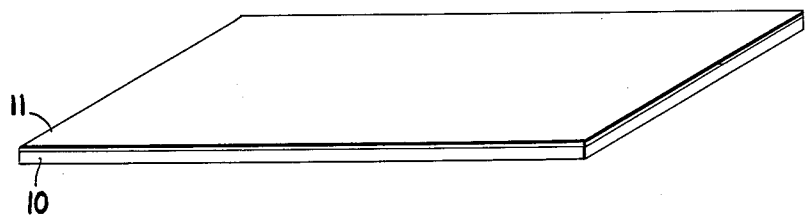
FIG. 1 is a fragmentary isometric view of a portion of a sheet element, such as a sheet of steel, covered by a priming coating of a blend of (1) an interpolymer of methyl methacrylate and a comonomer and (2) an epoxy resin and (3) a heat reactive phenolic resin.
Figure 2:
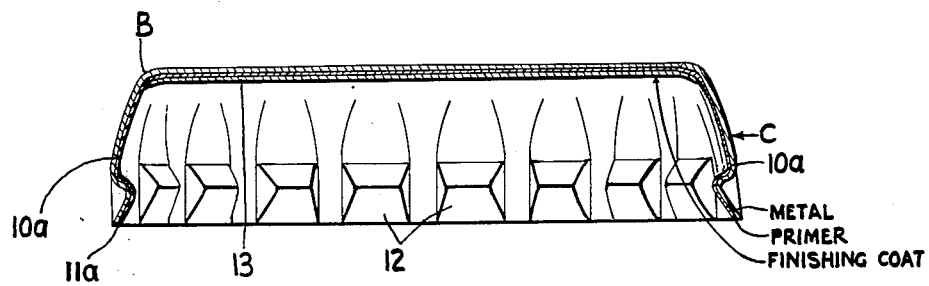
FIG. 2 is a sectional view of a shaped article, such as a bottle cap, formed from a blank of metal having a priming coating as shown in FIG. 1 and having a finishing coat of a plastisol.

In the form of the invention as illustrated by the drawings a sheet 10 of a metal, such as black iron, tin plate or other metal, is provided by dipping, spraying, roller coating, or other method, with a film 11 of one of the primers of the preceding Examples I through V and VIII through X. The film is cured, as for example, by baking. The blanks are then punched out and are formed into articles, such as bottle caps C, or other shaped articles comprising metal shell 10a, in an apparatus such as a press. The shell has flutings around its side wall as at 12.

In the operation of shaping the articles, the metals at the bends, for example at the bend B, is subjected to substantial drawing or extension. This tends also to stretch the primer 11a adherent thereto and with most primers, will produce failure. However, when the primer is properly formulated in accordance with the provisions of this invention, it retains its adhesion to the metal and provides a good surface for application of a finishing coat 13, even after the metal has been formed. The finishing coat 13 may be a plastisol. In the instance of bottle caps, or other articles of circular section, one method of applying the coatings comprises spinning the caps with a small amount of liquid plastisol composition therein. In this operation, the liquid coating material is distributed over the bottom of the inner surface of the cap, and subsequently, the film may be baked in order to fuse or cure the same.

It is also within the purview of the invention to apply a plastisol finishing coating over the cured primer coating upon a sheet of metal, such as is illustrated in FIG. 1. The coat is then fused by baking to obtain homogeneity.

If the finishing coat is of the composition which provides adequate flexibility and elongation, blanks may be punched out of the coated sheet and shaped in a subsequent operation. The labor and apparatus required to coat or to line the caps are thus greatly reduced.

The coating of the metal with a priming coat upon but a single side has been described. It will be apparent that both sides may also be similarly treated or if preferred, one side may receive the treatment herein disclosed and the other side may receive a coating of still another type, such as one of the conventional coatings.

Figure 3:
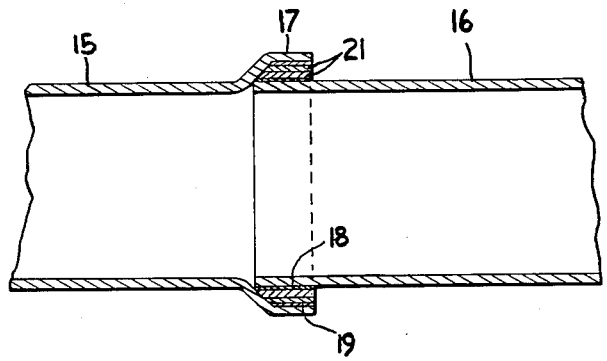
FIG. 3 is a fragmentary section through a joint of a clay pipe, such as a sewer pipe, in which the blend of components of this invention is employed as a primer medium.

The application of the principles of the invention is further illustrated in FIG. 3 in which fragmentary portions of two portions 15 and 16 of sewer pipe are shown. One of the sections 15 is provided with a bell 17 at one end and the contiguous end of the other section 16 is adapted to telescope therein. Priming coatings 18 and 19 are provided upon the telescoping surfaces. These coatings may be selected from the blends disclosed in the Examples I through V and VIII through X and each comprises a methyl methacrylate interpolymer blended with an epoxy resin and a heat reactive phenolic resin. The primer is cured to obtain homogeneity and in that state, it adheres tenaciously to the glazed surface of the pipe. The plastisol composition, such as polyvinyl chloride, dispersed in plasticizers, e.g. dioctylphthalate, and including pigments, such as red lead or the like, is disposed as a packing composition 21 between the primed surfaces. This packing composition is relatively plastic or yieldable in its nature but is strongly bonded to the priming coatings 18 and 19. The joint as thus obtained is strongly resistant to moisture and other agencies of deterioration that may contact with either or both the primer and the packing material.

It will be appreciated that the priming composition as disclosed herein may be applied to innumerable other articles than those illustrated herewith. Since the general mode of application is the same or substantially the same in each instance, specific description of all of the possible applications of the invention are not deemed to be necessary at this time.

Preferably a layer 21 thereof is applied to each primed surface and cured. When the pipe is laid, the layers 21 are nested concentrically with the contiguous surfaces pressing against each other to provide a seal.

We claim:

1. A primer for a vinyl resin dispersion comprising, a ternary mixture comprising (A) an epoxy resin which is a reaction product of a polyphenol and epichlorohydrin, (B) a heat reactive phenol-formaldehyde resin and (C)

an interpolymer of methyl methacrylate and an added monomer which is an ester of a carboxylic acid and an alcohol, one of which contains a $>C=CH_2$ group, the methyl methacrylate being used in an amount of about 50 to about 99 percent of the interpolymerizable mixture, the rest of the interpolymerizable mixture being essentially the added monomer.

2. A primer for a vinyl resin dispersion comprising, a ternary mixture comprising (A) an epoxy resin which is a reaction product of p,p'-isopropylidene diphenol and epichlorohydrin, (B) a heat reactive phenol-formaldehyde resin and (C) an interpolymer of methyl methacrylate and vinyl butyrate, said interpolymer consisting essentially of about 50 to about 99 percent of methyl methacrylate, the rest being vinyl butyrate.

3. A primer for a vinyl resin dispersion comprising a ternary mixture of (A) an epoxy resin which is a reaction product of a polyphenol and epichlorohydrin, (B) a heat reactive phenol-formaldehyde resin and (C) an interpolymer consisting essentially of about 50 to about 99 percent of methyl methacrylate, the rest being dibutyl itaconate.

4. A primer for a vinyl resin dispersion comprising a ternary mixture of (A) an epoxy resin which is a reaction product of a polyphenol and epichlorohydrin, (B) a heat reactive phenol-formaldehyde resin and (C) an interpolymer consisting essentially of methyl methacrylate and an ester of a carboxylic acid and an alcohol, one of which contains a terminal $>C=CH_2$ group, the methyl methacrylate constituting from about 50 to about 99 percent of the interpolymer, the rest being said ester.

5. A method of bonding a vinyl resin coating to a surface comprising applying to the surface, a primer comprising a ternary blend of a copolymer of (A) an epoxy resin which is a reaction product of a polyphenol and epichlorohydrin, (B) a heat reactive phenol-formaldehyde resin and (C) an interpolymer of about 50 to about 99 percent of methyl methacrylate, the rest of the interpolymer being essentially an added monomer which is an ester of an alcohol containing a $>C=CH_2$ group and a carboxylic acid; said primer coating further being coated with a plastisol comprising vinyl chloride and an ester plasticizer therefor.

6. A primer for a vinyl resin dispersion comprising a ternary mixture of (A) an epoxy resin which is a reaction product of a polyphenol and epichlorohydrin, (B) a heat reactive phenol-formaldehyde resin and (C) an interpolymer of about 50 to about 99 percent of methyl methacrylate, the rest being added monomer which is an ester monomer of a carboxylic acid and an alcohol one of which contains a $>C=CH_2$ group, said interpolymer constituting from about 50 to about 95 percent by weight of the mixture, the rest of the mixture being essentially epoxy resin and heat reactive phenolic resin, the phenolic resin being present in an amount of 10 to 60 percent by weight of the combined weight of phenolic and epoxy resins.

7. A primer for a vinyl resin dispersion comprising a ternary mixture of (A) an epoxy resin which is a reaction product of p,p'-isopropylidene diphenol and epichlorohydrin, (B) a heat reactive phenol-formaldehyde resin and (C) an interpolymer of about 50 to about 99 percent of methyl methacrylate, the rest of the interpolymer being an added monomer which is an ester of a carboxylic acid and an alcohol, one of which contains a $>C=CH_2$ group, the interpolymer constituting about 50 to 95 percent by weight of the mixture, the rest of the mixture being essentially epoxy resin and phenolic resin, the latter being present in an amount of 10 to 60 percent by weight of the combined weights of the phenolic resin and epoxy resin.

References Cited in the file of this patent

UNITED STATES PATENTS

| | | |
|---|---|---|
| 1,823,869 | Baur | Sept. 15, 1931 |
| 1,967,275 | Williams | July 24, 1934 |
| 2,517,584 | Mapes et al. | Aug. 8, 1950 |
| 2,521,911 | Greenlee | Sept. 12, 1950 |
| 2,713,565 | Howard et al. | July 19, 1955 |
| 2,726,176 | Hatcher et al. | Dec. 6, 1955 |
| 2,787,603 | Sanders | Apr. 2, 1957 |
| 2,842,459 | Gollub et al. | July 8, 1958 |

UNITED STATES PATENT OFFICE
CERTIFICATION OF CORRECTION

Patent No. 3,011,909

December 5, 1961

Donald P. Hart et al.

It is hereby certified that error appears in the above numbered patent requiring correction and that the said Letters Patent should read as corrected below.

Column 1, line 48, for "different" read -- difficult --; column 6, line 54, for "sale" read -- salt --; column 7, line 57, for "on" read -- one --; lines 67 to 72, the formula should appear as shown below instead of as in the patent:

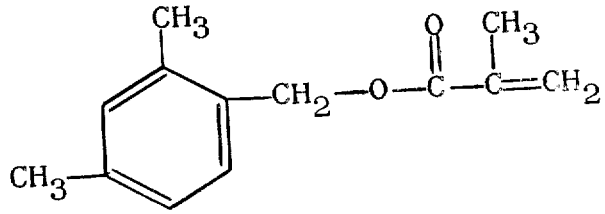

column 11, line 58, for "hardnes" read -- hardness --; column 12, line 3, for "durendiol" read -- durenediol --; column 13, line 21, for "prefered" read -- preferred --; column 16, line 2, for "350 F." read -- 350° F. --.

Signed and sealed this 9th day of October 1962.

(SEAL)
Attest:

ERNEST W. SWIDER
Attesting Officer

DAVID L. LADD
Commissioner of Patents